(12) United States Patent
Gebby et al.

(10) Patent No.: US 6,830,532 B1
(45) Date of Patent: Dec. 14, 2004

(54) METHOD FOR CONTROLLING A POWERTRAIN HAVING MULTIPLE TORQUE SOURCES

(75) Inventors: Brian P Gebby, Ferndale, MI (US); Thomas S Moore, Oxford, MI (US); Gerald Cilibraise, Livonia, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/630,042

(22) Filed: Jul. 30, 2003

(51) Int. Cl.[7] ............................ B60K 1/02; B60K 41/04
(52) U.S. Cl. ............................ 477/3; 477/905; 477/107
(58) Field of Search ............................ 477/3, 107, 905

(56) References Cited

U.S. PATENT DOCUMENTS 4,922,424 A  5/1990  Hiramatsu
6,198,178 B1  3/2001  Schienbein et al.
6,306,056 B1  10/2001  Moore
6,474,068 B1  11/2002  Abdel Jalil et al.
6,641,501 B2 *  11/2003  Kitajima et al. ............... 477/3

* cited by examiner

Primary Examiner—Dirk Wright
(74) Attorney, Agent, or Firm—Thomas A. Jurecko

(57) ABSTRACT

A method for controlling a powertrain in a motor vehicle having a first torque source and a second torque source each providing a torque output to a transmission includes determining a vehicle speed and a current gear selection of the motor vehicle. A threshold value is calculated from the vehicle speed and the current gear selection. An accelerator position of the motor vehicle is then determined. An accelerator position rate of change is calculated from the accelerator position. The accelerator position rate of change is compared to the threshold value. The torque output from the first torque source is increased if the accelerator position rate of change is less than the threshold value. However, the transmission is downshifted if the accelerator position rate of change is greater than the threshold value.

5 Claims, 2 Drawing Sheets

METHOD FOR CONTROLLING A POWERTRAIN HAVING MULTIPLE TORQUE SOURCES

FIELD OF THE INVENTION

The present invention relates to a method for controlling a powertrain and more particularly to a method for controlling a powertrain having multiple torque sources.

BACKGROUND OF THE INVENTION

Engines in current production automobiles are typically sized to meet certain performance requirements. For normal city and highway driving, a relatively large capacity engine is operated at low loads (e.g. at a partial torque output), which in turn leads to low engine efficiency and therefore high fuel consumption. Several approaches have been proposed to modify the powertrain of a vehicle such that it results in higher engine efficiency during low loads. One such solution is disclosed in commonly assigned U.S. Pat. No. 6,306,056 to Moore, herein incorporated by reference as if fully set forth herein. '056 to Moore discloses a hybrid vehicle having multiple separate torque sources coupled to a conventional automatic transmission. When the vehicle is operated at a relatively low rate of speed, only one of the torque sources is employed to propel the vehicle. When the torque demand exceeds the single torque source's maximum torque output, a second torque source is activated and engaged to the transmission, and synchronized with the first torque source.

However, typical automatic transmissions attached to traditional internal combustion engines reduce gear shifting in order to maintain a higher fuel economy. In a powertrain with multiple torque sources, as described above, initializing, starting, and synchronizing additional torque sources is less fuel efficient than shifting gears within the transmission.

SUMMARY OF THE INVENTION

A method for controlling a powertrain in a motor vehicle having a first torque source and a second torque source each providing a torque output to a transmission is provided. The method includes determining a vehicle speed and a current gear selection of the motor vehicle. A threshold value is calculated from the vehicle speed and the current gear selection. An accelerator position of the motor vehicle is then determined. An accelerator position rate of change is calculated from the accelerator position. The accelerator position rate of change is compared to the threshold value. The torque output from the first torque source is increased if the accelerator position rate of change is less than the threshold value. However, the transmission is downshifted if the accelerator position rate of change is greater than the threshold value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
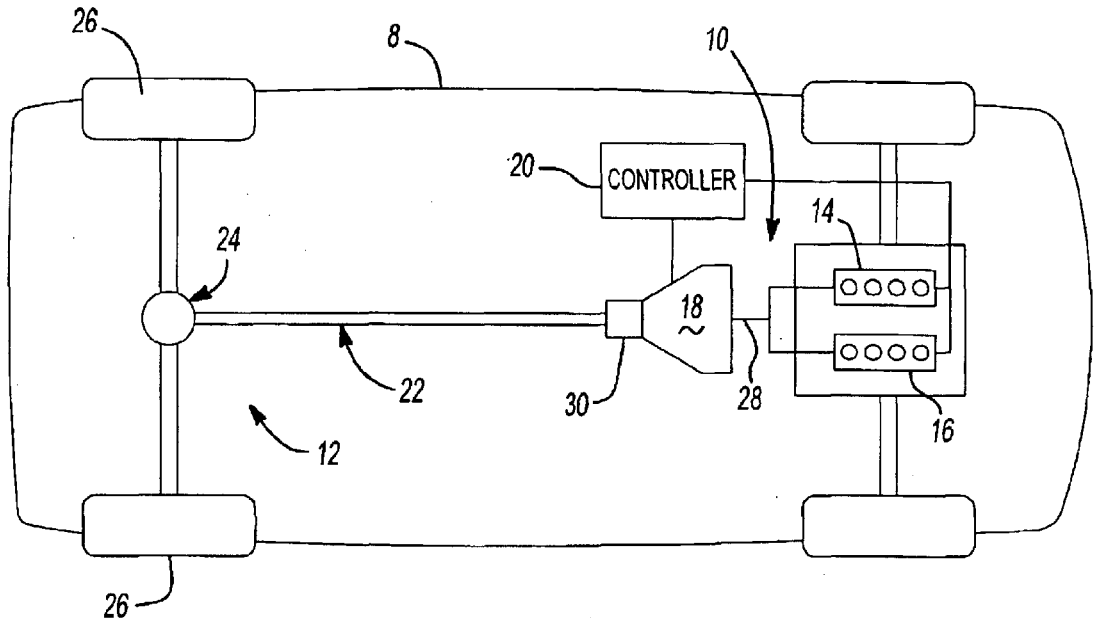
FIG. 1 is a schematic illustration of a motor vehicle having a powertrain constructed according to the principles of the present invention.

Referring to FIG. 1 of the drawings, a motor vehicle 8 is illustrated with a powertrain 10 constructed according to the principles of the present invention. The motor vehicle 8 further includes a driveline 12 driven by the powertrain 10. Those skilled in the art will appreciate that the incorporation of the powertrain 10 into the motor vehicle 8 is merely exemplary in nature and that the powertrain 10 has applicability to various other environments, for example motor boats or torque generation plants.

The powertrain 10 includes a first torque source 14, a second torque source 16, a transmission 18, and a controller 20. The first and second torque sources 14, 16 are each illustrated as 4-cylinder gasoline engines. However, it is to be understood that various gasoline engines may be employed each having any number of cylinders. Furthermore, any number of multiple torque sources may be included in the powertrain 10.

The driveline 12 includes a propshaft assembly 22 coupled to an axle assembly 24. The axle assembly 24 is in turn coupled to a pair of wheels 26.

The output of the first torque source 14 is inline and directly coupled to the transmission 18 for high efficiency and the second torque source 16 is selectively coupled via a conventional clutch (not specifically shown) to an input 28 of the transmission 18 in order to transmit rotary torque therebetween. The transmission 18 further includes an output 30 coupled for rotation to the propshaft assembly 22. Drive torque is transmitted through the propshaft assembly 22 to the rear axle 24 where it is selectively transferred to the pair of wheels 28.

Figure 2:
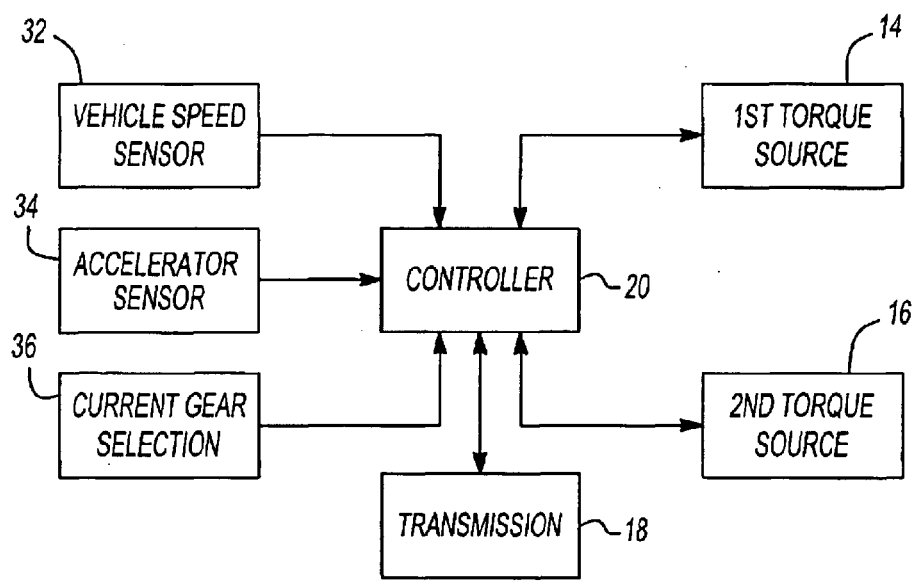
FIG. 2 is a schematic diagram of the control system for the powertrain constructed according to the principles of the present invention.

With reference now to FIG. 2, the controller 20 is in communication with the first torque source 14, the second torque source 16, the transmission 18, as well as a vehicle speed sensor 32, a accelerator sensor 34, and a gear selection sensor 36. The vehicle speed sensor 32 is coupled to the driveline 12 and operates to signal to the controller 20 the speed of the motor vehicle 8. The accelerator sensor 34 is coupled to the throttle accelerator (not specifically shown) of the motor vehicle 8 and operates to signal to the controller 20 the position of the throttle. The gear selection sensor 36 operates to signal to the controller 20 the current gear selection of the transmission 18. Alternatively, the controller 20 may receive a signal directly from the transmission 18 providing the current gear selection. The controller 20 is preferably an electronic microprocessor unit.

Figure 3:
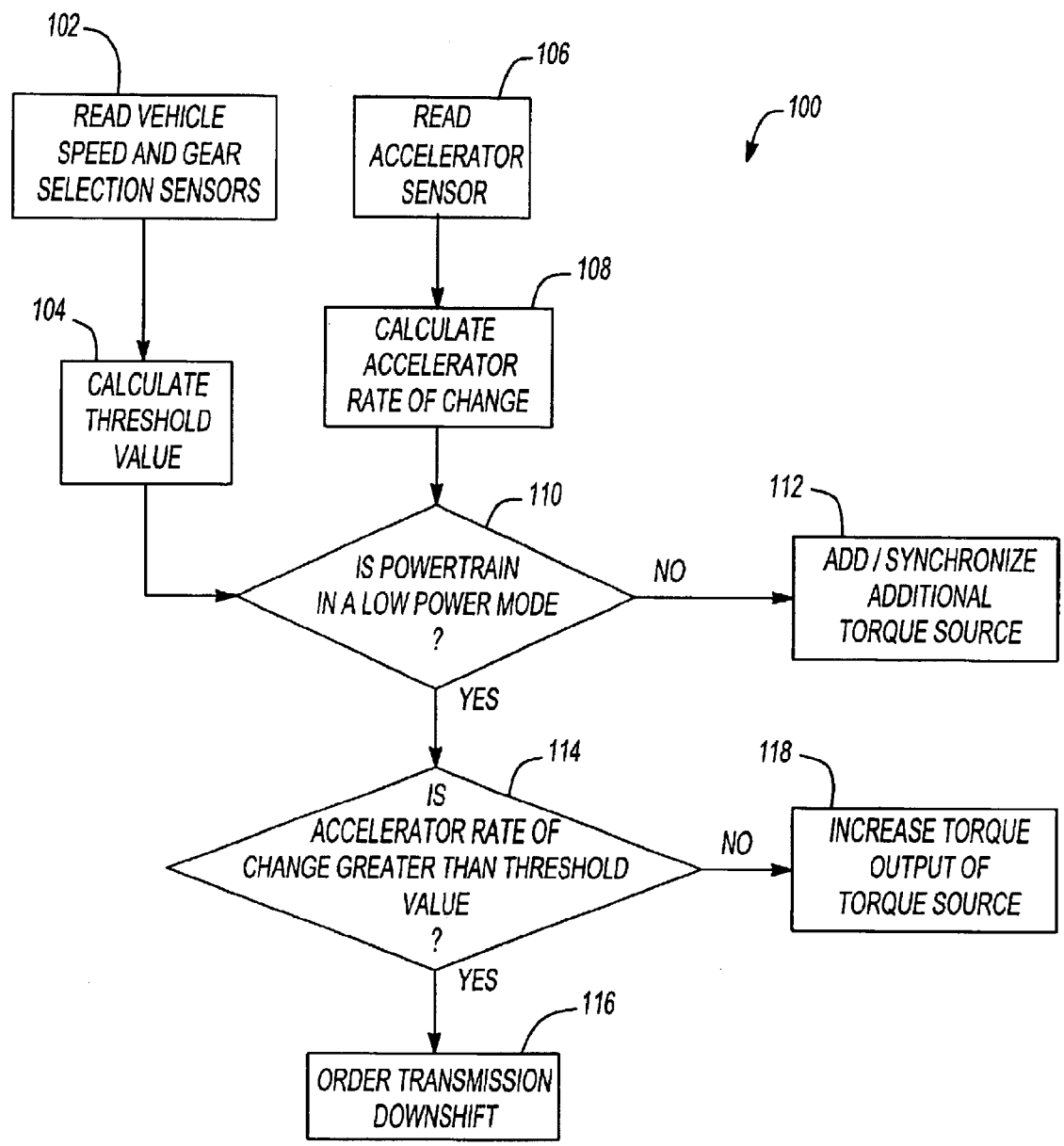
FIG. 3 is a flowchart illustrating a methodology for controlling the powertrain of the present invention.

Turning now to FIG. 3, a method for controlling the powertrain 10 according to the principles of the present invention is indicated generally by reference numeral 100. Initially only one of the torque sources 14, 16 (e.g., the first torque source 14) is engaged with the transmission 18 and providing rotational torque output to the driveline 22. The method 100 begins by reading the vehicle speed sensor 32 and the gear selection sensor 36 at step 102. The controller 20 then calculates from the vehicle speed and the current gear selection a "threshold value" at step 104. The threshold value is defined as the minimum value below which the first torque source 14 is commanded to accelerate the motor vehicle 8 in the current gear, and above which the transmission 18 is commanded to downshift for accelerating the motor vehicle 8 in a different gear. Alternatively, the threshold value may be calculated from other factors such as, for example, engine total hours of operation, current operating efficiency, and learned driver inputs such as usage of the accelerator, air conditioning utilization, and auxiliary power requirements.

The accelerator position sensor 34 is read at step 106 by the controller 20. The controller 20 then calculates the rate of change of the accelerator accelerator at step 108. The rate of change of the accelerator accelerator represents the desired acceleration of the motor vehicle 8 by the driver.

As mentioned above, only the first torque source 14 is engaged at this point to the transmission 18 and providing rotational output to the driveline 22. The controller 20 determines if the first torque source 14 is operating at full torque or less than full torque at step 110. If the first torque source 14 is in a full torque mode, the controller 20 orders the second torque source 16 to torque up and synchronize with the first torque source 14 at step 112. Synchronization of the second torque source 16 to the first torque source 14 may be accomplished using the method described in commonly assigned U.S. Pat. No. 6,474,068 B1, herein incorporated by reference in its entirety.

If the first torque source 14 is not operating in a full torque mode, the controller 20, shown in step 114, then compares the rate of change of the accelerator calculated in step 108 to the threshold value calculated in step 104.

If the rate of change of the accelerator position (e.g. if the rate of change of the acceleration) is greater than the threshold value, then the motor vehicle 8 requires a quick acceleration and the controller 20 orders the transmission 18 to downshift at step 116.

If the rate of change of the accelerator position (e.g. if the rate of change of the acceleration) is less than the threshold value, then the motor vehicle 8 does not require a quick acceleration and the controller 20 orders the first torque source 14 to increase its torque output at step 118.

By ordering the transmission 18 to downshift in those circumstances where quick acceleration is needed, the transmission 18 provides the required acceleration which is more fuel efficient than initializing and synchronizing an additional torque source.

The description of the invention is merely exemplary in nature and, thus, variations do not depart from the gist of the invention are intended to be within the scope of the invention. Such variations are not to be regarded as a departure from the spirit and scope of the invention.

What is claimed is:

1. A method for controlling a powertrain in a motor vehicle having a first torque source and a second torque source each providing a torque output to a transmission, the method comprising:

determining a vehicle speed and a current gear selection of the motor vehicle;

calculating a threshold value from the vehicle speed and the current gear selection;

determining a accelerator position of the motor vehicle;

calculating a accelerator position rate of change from the accelerator position;

comparing the accelerator position rate of change to the threshold value;

increasing the torque output from the first torque source if the accelerator position rate of change is less than the threshold value; and downshifting the transmission if the accelerator position rate of change is greater than the threshold value.

2. The method of claim 1, wherein determining the vehicle speed and current gear selection includes reading a vehicle speed sensor and a gear selection sensor in the motor vehicle.

3. The method of claim 1, wherein determining a accelerator position includes reading a accelerator sensor in the motor vehicle.

4. The method of claim 1, further comprising synchronizing the second torque source to the first torque source if the first torque source is at full torque and the accelerator position rate of change is less than the threshold value.

5. The method of claim 1, wherein calculating the threshold value further includes analyzing engine total hours of operation, current operating efficiency, usage of the accelerator, air conditioning utilization, and auxiliary power requirements.

* * * * *